(12) United States Patent
Sullivan et al.

(10) Patent No.: US 7,689,631 B2
(45) Date of Patent: Mar. 30, 2010

(54) METHOD FOR UTILIZING AUDIENCE-SPECIFIC METADATA

(75) Inventors: Dave L. Sullivan, Canoga Park, CA (US); Paul N. Weinberg, Los Angeles, CA (US); David E. Brookler, Los Angeles, CA (US); Philip A. Tinari, Los Angeles, CA (US); Richard T. Endo, Los Angeles, CA (US); Nathan F. Yospe, Los Angeles, CA (US)

(73) Assignee: SAP, AG, Walldorf (DE)

( * ) Notice: Subject to any disclaimer, the term of this patent is extended or adjusted under 35 U.S.C. 154(b) by 399 days.

(21) Appl. No.: 11/141,985

(22) Filed: May 31, 2005

(65) Prior Publication Data

US 2006/0271957 A1 Nov. 30, 2006

(51) Int. Cl.
*G06F 17/30* (2006.01)
(52) U.S. Cl. ............... 707/803; 715/264; 715/265
(58) Field of Classification Search ............ None
See application file for complete search history.

(56) References Cited

U.S. PATENT DOCUMENTS

| | | | | |
|---|---|---|---|---|
| 5,400,077 A | * | 3/1995 | Cookson et al. | 348/556 |
| 5,805,118 A | | 9/1998 | Mishra et al. | |
| 5,913,033 A | * | 6/1999 | Grout | 707/E17.12 |
| 5,956,737 A | | 9/1999 | King et al. | |
| 6,018,742 A | | 1/2000 | Herbert, III | |
| 6,317,795 B1 | * | 11/2001 | Malkin et al. | 709/246 |
| 6,366,296 B1 | * | 4/2002 | Boreczky et al. | 707/104.1 |
| 6,429,879 B1 | * | 8/2002 | Sturgeon et al. | 707/100 |
| 6,480,669 B1 | * | 11/2002 | Tsumagari et al. | 386/125 |
| 6,492,990 B1 | * | 12/2002 | Peleg et al. | 345/473 |
| 6,501,421 B1 | * | 12/2002 | Dutta et al. | 342/357.13 |
| 6,526,426 B1 | | 2/2003 | Lakritz | |
| 6,532,442 B1 | | 3/2003 | Schumacher et al. | |
| 6,623,529 B1 | | 9/2003 | Lakritz | |
| 6,748,158 B1 | * | 6/2004 | Jasinschi et al. | 707/E17.028 |
| 6,904,449 B1 | * | 6/2005 | Quinones | 709/203 |

(Continued)

FOREIGN PATENT DOCUMENTS

WO  WO9222983  * 6/1992

OTHER PUBLICATIONS m-w.com, "Merriam Webster's definition of metadata", Dec. 31, 1983 p. 1, <Retrieved Mar. 3, 2008>.*

(Continued)

*Primary Examiner*—Khanh B Pham
(74) *Attorney, Agent, or Firm*—Dalina Law Group, P.C.

(57) ABSTRACT

One or more embodiments of the invention enable a user to create multiple non-redundant views using metadata targeted at a specific audience that comprises language, regional, regulatory and/or cultural specific values. The word "audience" for the purposes of this specification means a group of document consumers such as people or computers that are associated with a language, country, region, regulation or culture. Audience specific data therefore is data targeted at a specific audience and audience specific metadata is related to the descriptive information related to the data, such as a table name or a field name for example. At least one embodiment of the invention makes use of rule-based inheritance in providing metadata values via layers that comprise audience specific data.

11 Claims, 8 Drawing Sheets

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |
| 29 | 0 | ball bag | ... |
| 47 | 0 | ball basket | ... |

U.S. PATENT DOCUMENTS

| | | | |
|---|---|---|---|
| 6,922,843 B1* | 7/2005 | Herrington et al. | 725/30 |
| 7,051,022 B1* | 5/2006 | Faisal | 707/5 |
| 7,165,174 B1* | 1/2007 | Ginter et al. | 713/153 |
| 7,185,352 B2* | 2/2007 | Hallford et al. | 725/28 |
| 7,206,748 B1* | 4/2007 | Gruse et al. | 705/1 |
| 7,246,104 B2* | 7/2007 | Stickler | 707/1 |
| 2002/0007279 A1* | 1/2002 | Matsuda et al. | 704/277 |
| 2002/0065721 A1* | 5/2002 | Lema et al. | 705/14 |
| 2002/0069049 A1 | 6/2002 | Turner | |
| 2003/0005159 A1* | 1/2003 | Kumhyr | 709/246 |
| 2003/0154071 A1* | 8/2003 | Shreve | 704/9 |
| 2004/0032393 A1* | 2/2004 | Brandenberg et al. | 345/156 |
| 2004/0093268 A1* | 5/2004 | Ramchandani et al. | 705/14 |
| 2004/0096199 A1* | 5/2004 | Chou et al. | 386/125 |
| 2005/0004838 A1* | 1/2005 | Perkowski et al. | 705/14 |
| 2005/0021862 A1* | 1/2005 | Schroeder et al. | 709/246 |
| 2005/0060245 A1* | 3/2005 | Hoffman et al. | 705/28 |
| 2005/0076097 A1* | 4/2005 | Sullivan et al. | 709/218 |
| 2005/0091274 A1* | 4/2005 | Stanford | 707/104.1 |
| 2005/0171863 A1* | 8/2005 | Hagen | 705/26 |
| 2006/0031870 A1* | 2/2006 | Jarman et al. | 725/25 |
| 2006/0047974 A1* | 3/2006 | Alpern et al. | 713/191 |
| 2006/0080285 A1 | 4/2006 | Chowdhuri | |
| 2006/0130118 A1* | 6/2006 | Damm | 725/135 |
| 2006/0184492 A1* | 8/2006 | Long et al. | 706/47 |

OTHER PUBLICATIONS

OED.com, Oxford English Dictionary Online, entry for "electrophoretic", Mar. 2008, Oxford University Press. <Retrieved Jul. 30, 2008>.*

OED.com, Definition of "database", Dec. 1989, Oxford English Dictionary, Oxford University Press, p. 1-2, <Retrieved from internet Feb. 14, 2009>.*

He et al, "Multiscale Condiitional Random Fields for Image Labeling", Jun. 2004, p. 1-8, , <Retrieved from examiner files on Feb. 14, 2009>.*

* cited by examiner

Figure 1

MAIN DATA TABLE

| PRODUCT_ID | NAME_ID | 119 | ... | ACCESSORY | WEIGHT |
|---|---|---|---|---|---|
| 220304 | 17 | 334 | ... |  | 1.2 |
| 220305 | 22 | 427 | ... | 29;47 | 0.6 |

Figure 2

DATA ATTRIBUTE TABLE

| NAME_ID | AUDIENCE_ID | NAME | ... |
|---|---|---|---|
| 17 | 0 | tennis sweater | ... |
| 17 | 1 | tennis jumper | ... |
| 22 | 0 | tennis ball | ... |
| 29 | 0 | ball bag | ... |
| 47 | 0 | ball basket | ... |

Figure 3

AUDIENCE ORDER TABLE

| audience_ID | audience_order | position | alive |
|---|---|---|---|
| 0 | 0;1;4;#;3;2 | 0 | TRUE |
| 1 | 1;0;#;4 | 1 | TRUE |
| 2 | 2 | 2 | FALSE |
| 3 | 3;0;1;2 | 3 | TRUE |
| 4 | 0;4;#;1 | 0 | TRUE |
| ... | ... | ... | |

Figure 4

AUDIENCE TABLE

| audience_ID | language | country | region | name | ... |
|---|---|---|---|---|---|
| 0 | eng | USA | whole | English US | ... |
| 1 | eng | AUS | whole | English Australia | ... |
| 2 | esp | MEX | whole | Spanish Mexico | ... |
| 3 | eng | USA | California | English Calif | ... |
| 4 | eng | CAN | whole | English CAN | |

Figure 5

METADATA TABLE

| META_ID | AUDIENCE_ID | NAME | ... |
|---------|-------------|-------------|-----|
| 119 | 0 | Description | ... |
| 119 | 2 | Descripcion | ... |
| ... | ... | ... | ... |

| Record Detail | Language Detail | Family Detail | Validations | Workflow | Search Selections |
|---|---|---|---|---|---|
| | English [US] | | English [UK] | | Japanese [JA] |
| Description | Kodachrome Professional Slide Film | | Kodachrome Professional Slide Film | | Kodachrome の専門のスライドのフィルム |
| Category | Professional Slide Film | | Professional Slide Film | | 専門のスライドのフィルム |
| Manufacturer | Kodak | | Kodak | | Kodak |
| Long Description | Long the leader in variety and Excellent natural color quality with | | Long the leader in variety and Excellent natural color quality with | | 変化及び技術、コダックの長くリーダーは Excellent natural color quality with superior |
| Pictures | Kodachrome 64 PROFESSIONAL | | Kodachrome 64 PROFESSIONAL | | Kodachrome 64 PROFESSIONAL |
| Spec Sheets | | | | | |

700 — Description
701 — Category
702 — Manufacturer
703 — Long Description
704 — Pictures

| | English [US] | English [UK] | Japanese [JA] |
|---|---|---|---|
| Description | Kodachrome Professional Slide Film | Kodachrome Professional Slide Film | Kodachrome の専門のスライドのフィルム |
| Category | Professional Slide Film | Professional Slide Film | 専門のスライドのフィルム |
| Manufacturer | Kodak | Kodak | Kodak |
| Long Description | Long the leader in variety and Excellent natural color quality with | Long the leader in variety and Excellent natural color quality with | 変化及び技術、コダックの長くリーダーは Excellent natural color quality with superior |
| Pictures | Kodachrome 64 PROFESSIONAL | Kodachrome 64 PROFESSIONAL | Kodachrome 64 PROFESSIONAL |
| Spec Sheets | | | |

METHOD FOR UTILIZING AUDIENCE-SPECIFIC METADATA

BACKGROUND OF THE INVENTION

1. Field of the Invention

Embodiments of the invention described herein pertain to the field of computer systems. More particularly, but not by way of limitation, one or more embodiments of the invention enable a user to create multiple non-redundant views using metadata targeted at a specific audience that comprises language, regional, regulatory and/or cultural specific values.

2. Description of the Related Art

Current systems comprise storing data associated with multiple languages using techniques that are memory and labor intensive. These systems do not take advantage of values that are identical in each language and do not allow for metadata to vary based on a target audience. Internationalization efforts to date allow for language, country and locale variations, but do not allow for further subdivisions based on regional, regulatory, cultural variations and do not allow for easy creation of views having locale specific metadata. For example, when providing a view of data targeted for a particular audience there is no easy method of implementing table and field name metadata targeted at multiple audiences. Hence, although the information displayed in a given table may be altered into a different language, creation of different views with different table and field names is currently a manual process.

For at least the limitations described above there is a need for a system that enables a user to easily provide audience specific metadata comprising language, regional, regulatory and/or cultural specific values per layer without redundant effort.

SUMMARY OF THE INVENTION

One or more embodiments of the invention enable a user to create multiple non-redundant views using metadata targeted at a specific audience that comprises language, regional, regulatory and/or cultural specific values. The word "audience" for the purposes of this specification means a group of document consumers such as people or computers that are associated with a language, country, region, regulation or culture. Audience specific data therefore is data targeted at a specific audience and audience specific metadata is related to the descriptive information related to the data, such as a table name or a field name for example. At least one embodiment of the invention makes use of rule-based inheritance in providing metadata values via layers that comprise audience specific data.

Initial creation of a multi-audience document comprises setting up an audience inheritance hierarchy and entry and edit of data for each desired audience. The audience hierarchy may be implemented as a tree or linear structure or any other structure allowing for one audience to specify another audience in which to inherit data from. For example when obtaining a data value for a particular audience, if that value does not exist for that audience then the audience hierarchy may be utilized to find the data value for an inherited audience. A data value may exist in the main data table or a data attribute table in the case of a lookup value as will be explained below. By adding regional, cultural or regulatory subdivisions within the audience hierarchy and inheriting large portions of existing audience specific data entries, a large number of audience specific documents may be generated with a minimal amount of data entry required. Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. The main data table is not required to be altered when adding an audience, as an audience is defined in the audience table and lookup values may be added for an audience to the data attribute table. Audiences may be specified in a given order for traversal within the hierarchy and used in order to display data with visual characteristics to inform a user if the value for a particular piece of data is being used from the current layer or is inherited. By implementing the table names and field names of the data repository using inheritance via the same audience hierarchy, redundant data entry for metadata values is eliminated.

Data may also be imported into the system and associated with a particular layer. After importing data, the data may be searched. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers. Import and export of metadata associated with a layer allows for views targeted at a specific audience to also comprise audience specific values.

Figure 1:
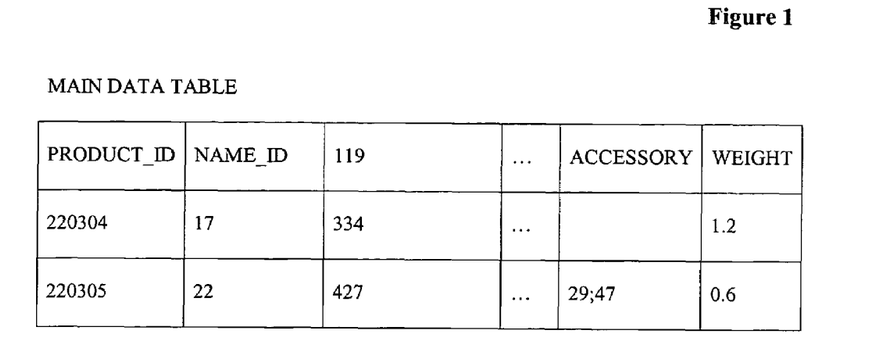
FIG. 1 illustrates a main data table used in conjunction with one or more embodiments of the invention.
Figure 2:
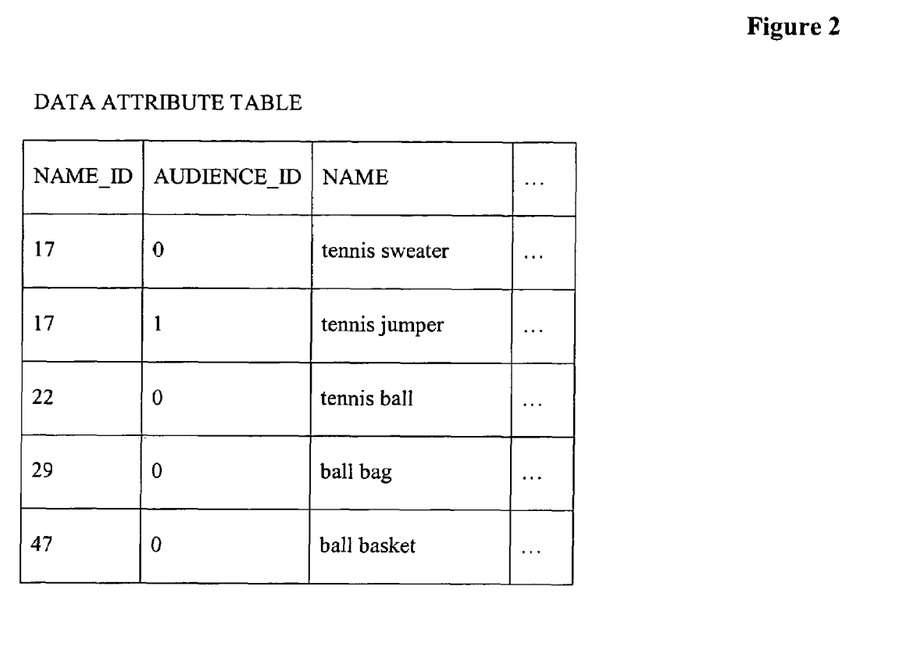
FIG. 2 illustrates a data attribute table used in conjunction with one or more embodiments of the invention.
Figure 3:
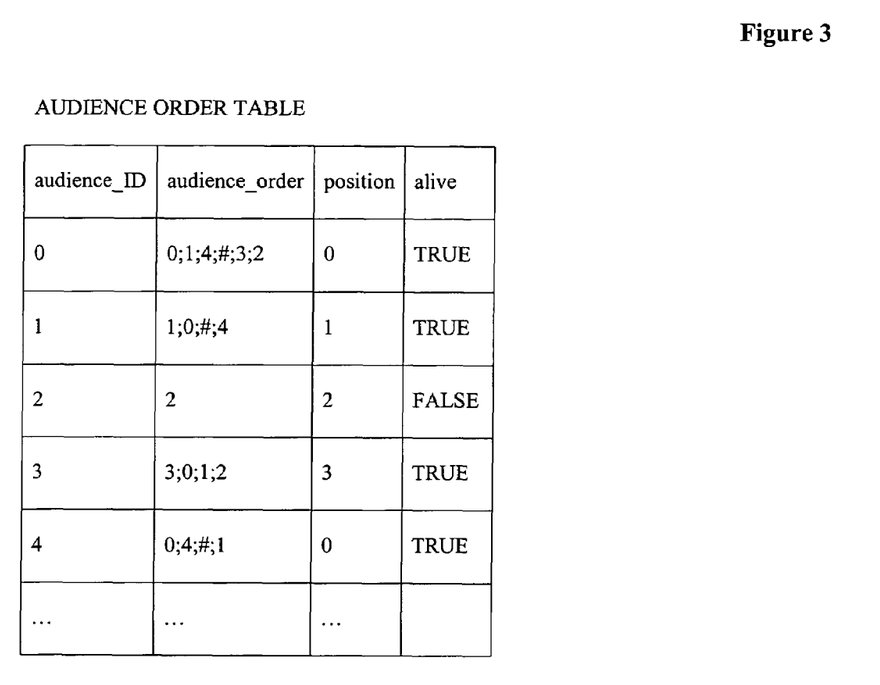
FIG. 3 illustrates an audience order table used in conjunction with one or more embodiments of the invention.
Figure 5:
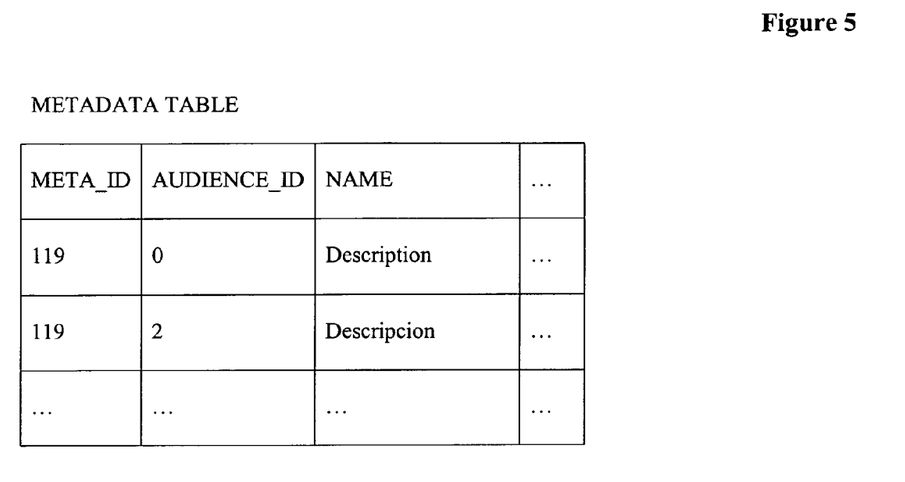
FIG. 5 illustrates a metadata table used in conjunction with one or more embodiments of the invention.

Initial creation of a multi-audience document comprises setting up an audience inheritance hierarchy, and edit of data and metadata for each desired audience. The audience hierarchy may be implemented as a tree or linear structure or any other structure allowing one audience to specify another audience in which to inherit data from. For example when obtaining a data or metadata value for a particular audience, if that value does not exist for that audience then the audience hierarchy may be utilized to find the data or metadata value for an inherited audience. A data value may exist in the main data table in the case of a non-lookup value or a data value may exist in a data attribute table in the case of a lookup value that is indirectly referenced via a link as will be explained below. A metadata value may exist as a non-lookup or lookup value and be obtained from a metadata table. FIG. 1 shows a main data table comprising products for example. The name of a product in this example is entered into another table namely the data attribute table shown in FIG. 2. For each audience that has a unique value for the given data attribute, an entry in the data attribute table may be created. For example, product number 220304 shown in the main data table comprises an audience specific name that is a lookup value that is obtained from the data attribute table when generating a document. Specifically, NAME_ID 17 is obtained from the data attribute table for a desired audience identifier. In this case, if the audience identifier is 0 then the name "tennis sweater is obtained." If the audience identifier is 1 then the name "tennis jumper" is obtained. For example, when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name (no NAME_ID 22 and AUDIENCE_ID 1 entry exists in the data attribute table), then the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. In other words, the value "tennis ball" is obtained since the NAME_ID 22 and AUDIENCE_ID 0 is used to obtain this inherited value. In FIG. 1, the ACCESSORY field shows a NULL value for PRODUCT_ID 220304 and a value of "29;47" for PRODUCT_ID 220305. The "29; 47" entry is a multi-value lookup field that specifies two links to the data attribute table. The WEIGHT column shows entries that are local to the main data table and are not obtained via lookup using the data attribute table. FIG. 5 shows the metadata description table. In this table, meta_id value 119 with audience identifier 0 results in a metadata value of "description" which is what the output table is labeled with for the third field of the table shown in FIG. 1 if the current audience identifier was 0, 1, 3 or 4 as per the audience order table shown in FIG. 3. If the current audience identifier was 2 then the metadata value of "descripcion" is used in labeling the third column of the output table shown in FIG. 1. If the audience identifier 1 in FIG. 3 had an audience order of "1;2;#;0;4" then the metadata value of "descripcion" is used since the hierarchy runs through Spanish before arriving at audience identifier 0.

Initial entry of data and metadata specific to an audience may comprise adding a very small amount of data and metadata if the audience may be based extensively on another audience. Since audience specific metadata is constructed and utilized in an identical manner as audience specific data albeit for table and field names as opposed to cell values, use of the words data and metadata are interchangeable herein. For example if one region of a given country does not allow a particular picture or word to be used for a given document, then that region may be defined as a separate audience that uses all of the data and/or metadata of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. For example, a field name that is inherited from the primary inheritance level may be displayed in green to show that the field name will be using inheritance in the final output document.

There are at least three types of fields used with embodiments of the invention, non-lookup fields, lookup fields and multi-value lookup fields. Non-lookup fields are traditional fields that have a value in a field. Lookup fields comprise a link to another table that specifies a value in the second table. Multi-value lookup fields may comprise more than one link to another table or alternatively may comprise a link identifier to a number of fields in another table. Multi-value lookup fields that comprise more than one link per field are shown herein with semicolons separating the multiple links in a given field. One skilled in the art will readily appreciate that any method of indirectly associating multiple values with one field is in keeping with the spirit of the invention. Generally, metadata may be implemented as non-lookup or lookup fields.

DETAILED DESCRIPTION OF THE INVENTION

A method for utilizing audience-specific metadata will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Initial creation of a multi-audience document comprises setting up an audience inheritance hierarchy and entry and edit of data and metadata for each desired audience. The audience hierarchy may be implemented as a tree or linear structure or any other structure allowing for one audience to specify another audience in which to inherit data from. For example when obtaining a data or metadata value for a particular audience, if that value does not exist for that audience then the audience hierarchy may be utilized to find the data or metadata value for an inherited audience. A data value may exist in the main data table in the case of a non-lookup value or a data value may exist in a data attribute table in the case of a lookup value that is indirectly referenced via a link as will be explained below. A metadata value may exist as a non-lookup or lookup value and obtained from a metadata table. FIG. 1 shows a main data table comprising products for example. The name of a product in this example is entered into another table namely the data attribute table shown in FIG. 2. For each audience that has a unique value for the given data attribute, an entry in the data attribute table may be created. For example product number 220304 shown in the main data table comprises an audience specific name that is a lookup value that is obtained from the data attribute table when generating a document. Specifically, NAME_ID 17 is obtained from the data attribute table for a desired audience identifier. In this case if the audience identifier is 0 then the name "tennis sweater is obtained." If the audience identifier is 1 then the name "tennis jumper" is obtained. For example when obtaining a data value for a particular audience, if that value does not exist for that audience then the audience hierarchy may be utilized to find the data value for an inherited audience. In this case, if audience 1 is used in obtaining the name of product 220305, then reference name identifier 22 is used to look up the actual product name in the data attribute table. Since there is no name identifier and audience identifier combination that yields a name (no NAME_ID 22 and AUDIENCE_ID 1 entry exists in the data attribute table), then the audience order table shown in FIG. 3 is referenced in order to obtain the next audience identifier to use in finding a suitable value via inheritance. Since the next value in the audience order field for audience 1 is 0, then audience 0 is used in looking up the value next in the data attribute table. In this way, only one entry for a given data entry is required since multiple audiences can share the value. In other words, the value "tennis ball" is obtained since the NAME_ID 22 and AUDIENCE_ID 0 is used to obtain this inherited value. In FIG. 1, the ACCESSORY field shows a NULL value for PRODUCT_ID 220304 and a value of "29;47" for PRODUCT_ID 220305. The "29;47" entry is a multi-value lookup field that specifies two links to the data attribute table. The WEIGHT column shows entries that are local to the main data table and are not obtained via lookup using the data attribute table. FIG. 5 shows the metadata description table. In this table, meta id value 119 with audience identifier 0 results in a metadata value of "description" which is what the output table is labeled with for the third field of the table shown in FIG. 1 if the current audience identifier was 0, 1, 3 or 4 as per the audience order table shown in FIG. 3. If the current audience identifier was 2 then the metadata value of "descripcion" is used in labeling the third column of the output table shown in FIG. 1. If the audience identifier 1 in FIG. 3 had an audience order of "1;2;#;0;4" then the metadata value of "descripcion" is used since the hierarchy runs through Spanish before arriving at audience identifier 0.

Figure 4:
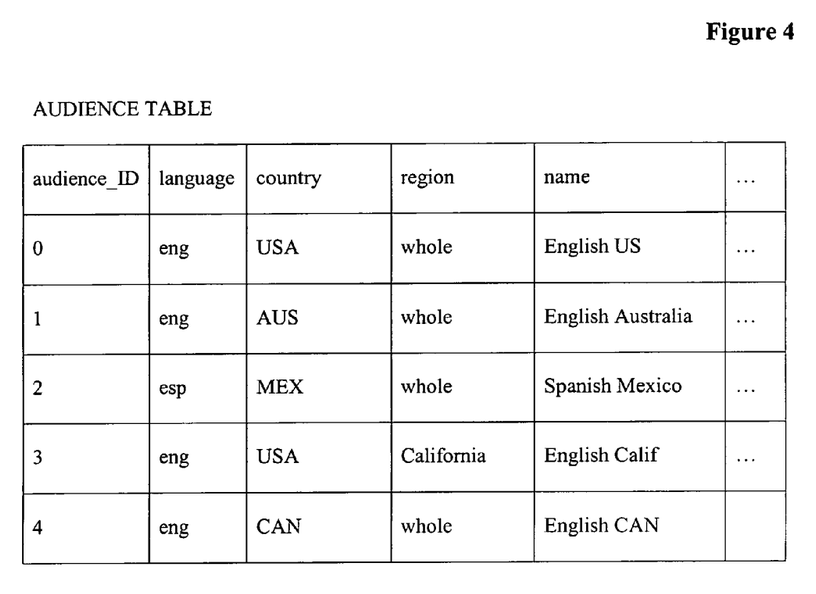
FIG. 4 illustrates an audience table used in conjunction with one or more embodiments of the invention.

By adding regional, cultural or regulatory subdivisions within the audience hierarchy and inheriting large portions of existing audience specific data entries, a large number of audience specific documents may be generated with a minimal amount of data entry required. In the example shown in FIG. 2, if there a thousand separate entries related to tennis and only a few of the items differ in name between audiences, then the second audience addition comes at very little expenditure of labor in entering the data that differs. For example, audience 1 corresponding to English Australia in the audience table shown in FIG. 4 may be added taking advantage of nearly all of the entries of the English US audience. In addition, setting up a corresponding audience order entry in the audience order table shown in FIG. 3 allows for the traversal of audiences in a hierarchical manner in order to obtain or search for values or the existence of values. For this example, audience 1 specifies that it first utilize its own audience identifier 1 in obtaining or searching for data, followed by audience identifier 0. The semicolon specifies a stop flag that denotes that any data found lower (to the right) in the hierarchy should not be published, but may be shown on the user interface to aid in the publication of a multi-audience document. Generally, a small amount of metadata additions are performed when adding audiences that are somewhat related, and addition of an audience that does not inherit many or all of the values of an existing audience is still relatively small to the total amount of data entry used in the system.

There are at least three types of fields used with embodiments of the invention, non-lookup fields, lookup fields and multi-value lookup fields. Non-lookup fields are traditional fields that have a value in a field such as the WEIGHT field shown in FIG. 1. Lookup fields comprise a link to another table that specifies a value in the second table such as the NAME_ID field shown in FIG. 1. Multi-value lookup fields may comprise more than one link to another table or alternatively may comprise a link identifier to a number of fields in another table such as the ACCESSORY field shown in FIG. 1. Although multi-value lookup fields that comprise more than one link per field are shown herein with semicolons separating the multiple links in a given field. One skilled in the art will readily appreciate that any method of indirectly associating multiple values with one field is in keeping with the spirit of the invention. Although the example tables shown comprise one level of indirection, the data attribute table may comprise a link to a lookup table for lookup values and a text or numerical entry for a non-lookup value thereby removing non-lookup values from the main data table and providing another level of indirection. Any level of indirection is in keeping with the spirit of the invention with regards to data or metadata.

Use of an audience hierarchy eliminates redundant data entry, minimizes the maintenance required to support the data and allows for rapid addition of audiences to be utilized in generating a particular document. Updating information for multiple audiences occurs automatically without the need to update all entries for a given hierarchy since inherited values are automatically available to audiences in the same hierarchy. For example, updating the name of a non-lookup value, lookup value or multi-value lookup is automatically available to any audience inheriting values from a given audience. The main data table is not required to be altered when adding an audience, as an audience is defined in the audience table and lookup values may be added for an audience to the data attribute table with metadata values added to the metadata table. Combined use of data and metadata in one table is enabled when unique identifiers are allocated to data attribute entries and metadata entries. Audiences may be specified in a given order for traversal within the hierarchy and used in order to display data with visual characteristics to inform a user if the value for a particular piece of data or metadata is being used from the current layer or is inherited. For example as shown in FIG. 2, by adding any value such as was done for name identifier 22, that value is available to all audiences that comprise the audience 0 in their inheritance chain as shown in FIG. 3. The main data table shown in FIG. 1 is not required to be altered for all audiences, instead attributes are added or modified in the main data table or in the data attribute table shown in FIG. 2 and are automatically available to audiences that inherit these values.

Data and metadata may also be imported into the system and associated with a particular layer. After importing data, the data and metadata may be searched. When importing data, the import can be directed to a particular audience layer by querying the user, or obtaining an associated audience identifier from the user or from a computer in any convenient manner. In this manner the supported audiences may be built up from external programs or data sources and independently entered into the system. Exporting data may comprise exporting a particular audience layer or exporting all audience layers. Import and export may make use of existing file formats and applications from various software manufacturers.

Viewing data within the system occurs with respect to a current audience identifier. The audience identifier may be entered manually or automatically from the user or computer associated with a user. The audience identifier may specify the language, or the language and country, or the language, country and region, or the language, region and culture, or the culture and regulatory area or any other combination of audience identifying values. Specifying the current audience identifier allows for the proper hierarchy to be used in the search as per the inheritance hierarchy defined for each audience as per the audience order shown in FIG. 3.

Figure 6:
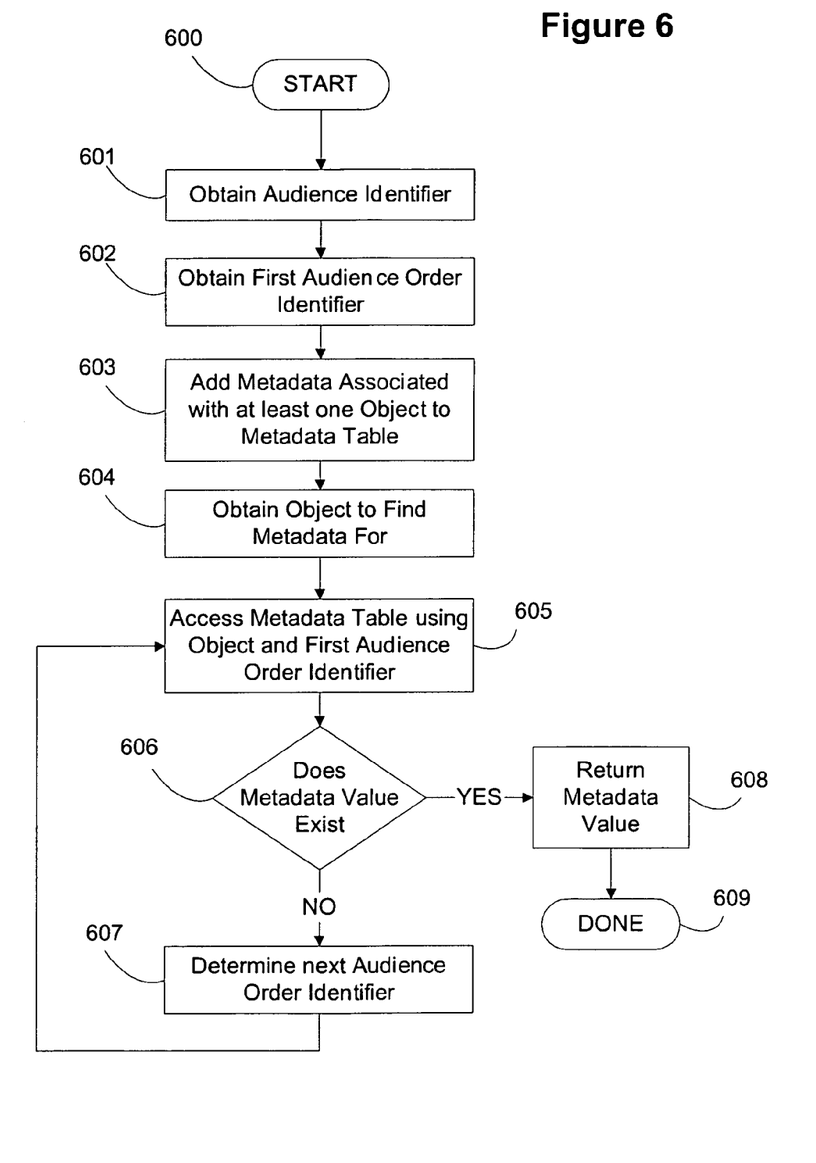
FIG. 6 illustrates a flow chart describing steps for accessing an audience specific metadata in conjunction with one or more embodiments of the invention.

FIG. 6 illustrates a flow chart describing the steps for accessing an audience specific metadata based on an audience identifier and an object. An example of an object is a table name or field name or any other type of metadata associated with data in a data set. Operation of one or more embodiments of the invention occurs after starting at 600. An audience identifier is obtained by the system at 601. The audience identifier may be entered manually or automatically from the user or computer associated with a user. Once the audience identifier is obtained, metadata associated with a first audience or a audience in a hierarchy may be entered and obtained using one or more embodiments of the invention. The hierarchy may be traversed by first obtaining an audience order identifier for an initial position from an audience order table or structure at 602. The audience order identifier specifies the actual audience to utilize when accessing a data table comprising values for at least one audience. An object for which metadata will eventually be obtained is added to the system with respect to an audience at 603. A particular object such as a table name or field name that is desired for use in generating a view or document is obtained and used in order to find associated metadata at 604. The metadata specific to a given audience is obtained from the metadata table using the first audience order identifier and the specific object at 605. If the metadata value exists as determined at 606, it is returned at 608 and processing ends at 609. If the value does not exist for a given audience order identifier and object, then the audience order table is accessed in order to find the next audience identifier to utilize in accessing the metadata table that may comprise the value at 607. The next position found in the audience order table for a given audience identifier is utilized in order to access the metadata table. The processing repeats at 605 until a metadata value is found. Although the terminology of this processing utilizes database nomenclature data structures in memory may also be utilized as one skilled in the art will recognize.

Figure 7:
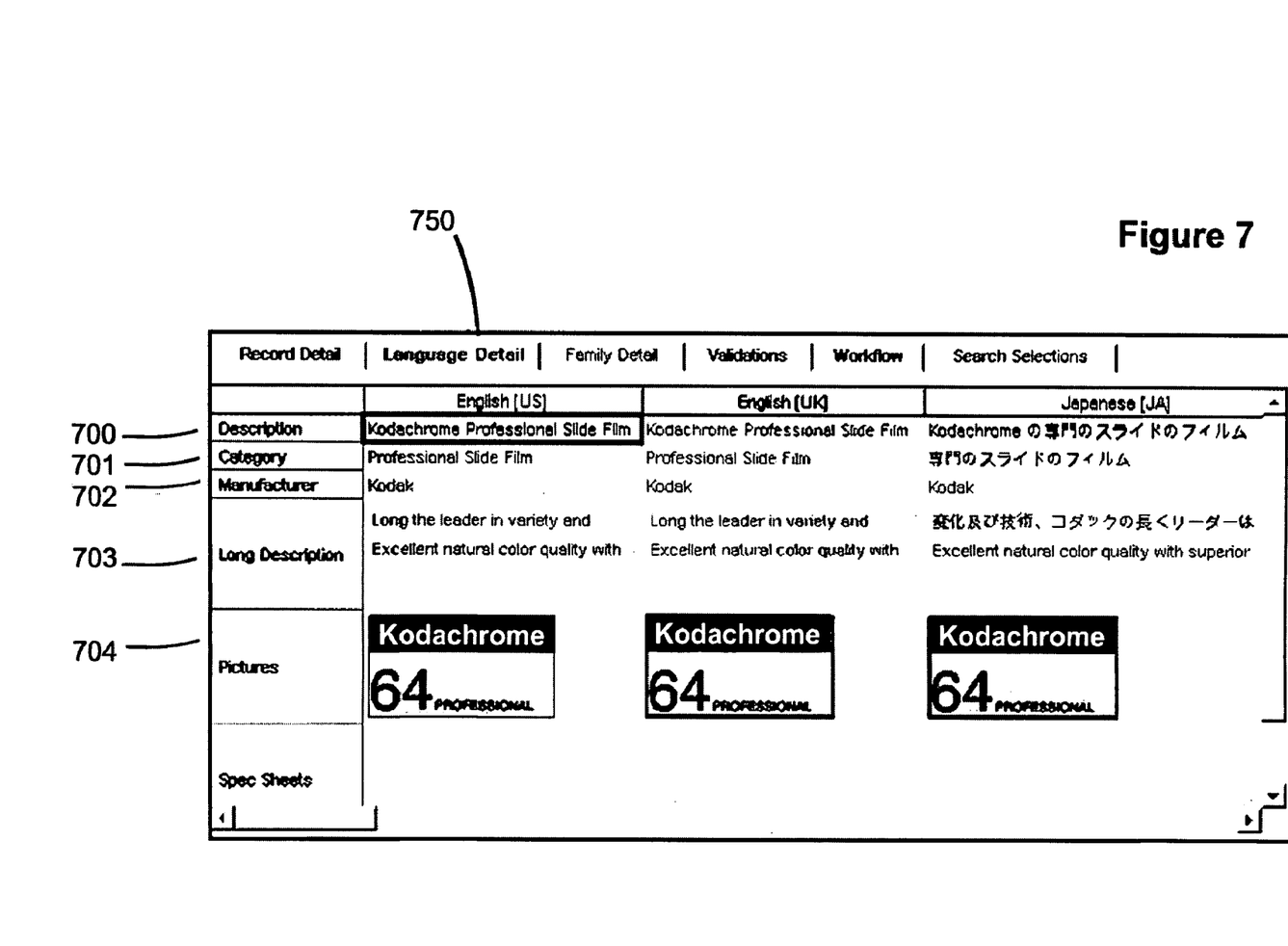
FIG. 7 illustrates an audience detail view for a data entry and edit application used in conjunction with one or more embodiments of the invention.

FIG. 7 illustrates an audience detail view for an embodiment of the data entry and edit application comprising a plurality of audience layer data and metadata values. The interface makes use of rule-based inheritance in creating and editing data used in generating a document targeted at a plurality of audiences. One or more embodiments of the invention comprise a user interface that distinguishes between current audience layer values as shown in the English [US] column, primary audience inheritance values as shown in the English [UK] column, and secondary audience inheritance values shown in the Japanese [JA] column. In this example, English [US] is the current audience layer, English [UK] is the primary audience layer and Japanese [JA] is the secondary audience layer. Through the use of color or any other mechanism that allows a user to quickly identify data that is missing and needs to be populated, changed or remain unchanged if the inherited data is suitable for the given audience. Using the interface described, users can determine at a glance what information is inherited and what level of inheritance that information is from. Assuming that the current audience setting is English [US] for example, the English [US] column comprises data values that may generally be all black if the English [US] audience is the predominantly populated audience. Certain values may appear green or red if for example they are not found in the English [US] layer and are obtained from another audience layer. This applies to metadata field name "Description" 700, Category values 701, Manufacturer values 702 and Long Description values 703 and the data associated with these field names. Picture values 704 may comprise borders around the pictures that are black, green or red to indicate the audience layer that they are inherited from. One or more embodiments of the invention may comprise an audience detail tab as opposed to a language detail tab if the audiences are split based on characteristics other than simply language.

Figure 8:
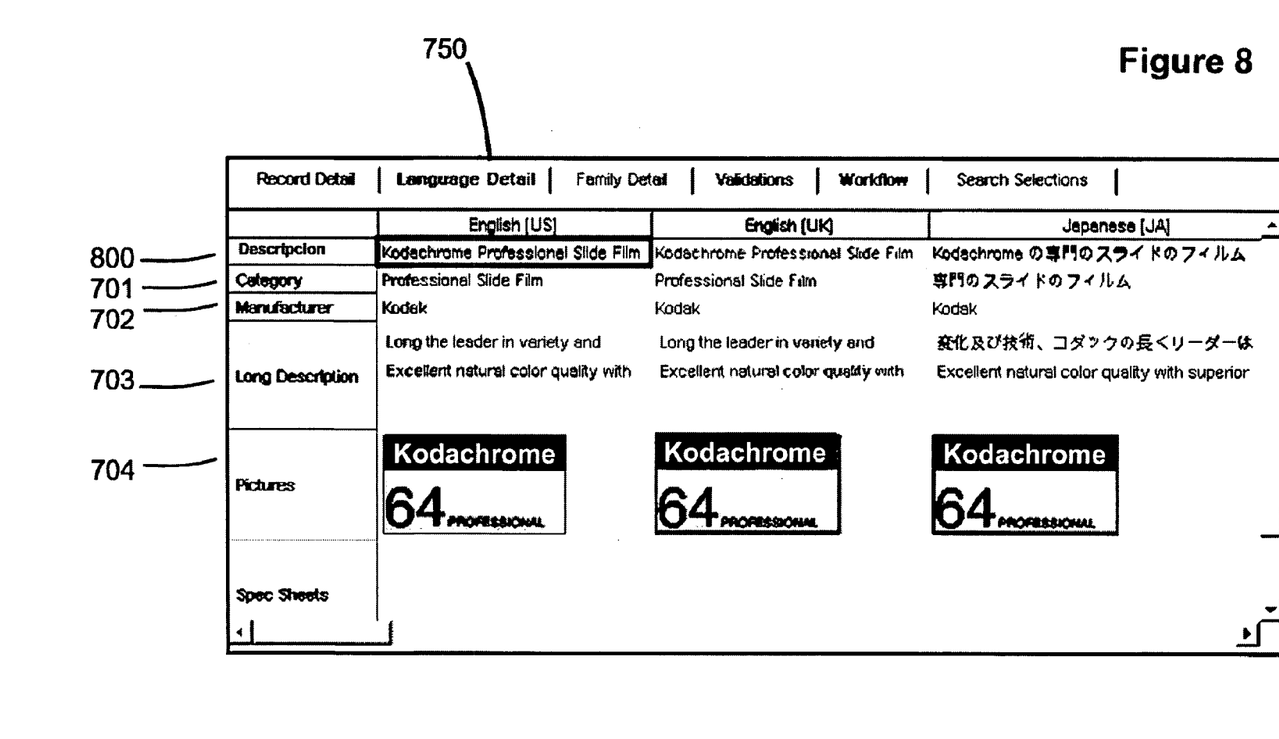
FIG. 8 illustrates metadata value which may be displayed in conjunction with one or more embodiments of the invention.

FIG. 8 shows metadata value 800 as "Descripcion" which may be displayed in red given that for a current audience identifier of English and no values found in the metadata table for audiences 0, 1, 4 or 3 as specified in audience order table as shown in FIG. 3. Therefore, if the metadata table comprises a value for this object for audience 2, i.e., Spanish in Mexico, as per the order "0;1;4;#;3;2", then the "Description" field is labeled "Descripcion" in any output for this object with respect to the current audience identifier of 0 (US English). This hold for the data entry and edit application, and one or more embodiments of the invention may or may not display the metadata value "Descripcion" for document publications since the metadata value is found lower in the hierarchy than the stop flag value "#". Display of values in generated documents or in data entry and/or edit applications for metadata values obtained below the stop flag value in the hierarchy is configurable in one or more embodiments of the invention.

Initial entry of data and metadata specific to an audience may comprise adding a very small amount of data and metadata if the audience may be based extensively on another audience. Since audience specific metadata is constructed and utilized in an identical manner as audience specific data albeit for table and field names as opposed to cell values, use of the words data and metadata are interchangeable herein. For example if one region of a given country does not allow a particular picture or word to be used for a given document, then that region may be defined as a separate audience that uses all of the data and/or metadata of an inherited audience except for the word or picture that is not allowed. If a particular color is undesirable for display in a given culture, then that color may be altered just for that culture. The actual addition of the data specifying the audience itself comprises a small amount of data and defines the hierarchy to traverse when a data entry is not found for a particular audience. By viewing the data and the associated color or other visual representation associated with an audience, the minimal amount of data entries may be made to take advantage of other existing audience data. One embodiment of the invention utilizes three layers of inheritance called the current, primary and secondary inheritance layer levels. The visual representation may involve the color black for the current layer, green for the primary inheritance layer and red for the secondary inheritance layer. In this case, when viewing the data under a current audience setting, text that is inherited from a first inherited audience may be green, and text for an audience that uses a secondary inheritance audience may be red. Pictures that are inherited may be surrounded by a black, green or red border to depict their inheritance level for example. Any other method of visually displaying the different levels of inheritance is in keeping with the spirit of the invention such as for example showing the current audience layer in bold type, the primary inheritance audience layer in regular type and the secondary inheritance audience layer in italic. For example, a field name that is inherited from the primary inheritance level may be displayed in green to show that the field name will be using inheritance in the final output document.

Embodiments of the invention may utilize any level of indirection and the non-lookup values shown in the main data table of FIG. 1 versus the lookup values shown in the data attribute table of FIG. 2 and metadata table of FIG. 5 are exemplary and are shown in this manner for ease of illustration. One skilled in the art will readily recognize that non-lookup values may be implemented one level of indirection lower as well as adding a second level of indirection to the lookup and multi-value lookup fields.

U.S. patent application Ser. No. 09/577,268 entitled "Timeshared Electronic Catalog System And Method" filed May 23, 2000, U.S. Pat. No. 6,754,666 entitled "Efficient Storage And Access In A Database Management System" filed Aug. 21, 2000, U.S. patent application Ser. No. 09/643,316 entitled "Data Indexing Using Bit Vectors" filed Aug. 21, 2000, U.S. patent application Ser. No. 09/643,207 entitled "Data Editing And Verification User Interface" filed Aug. 21, 2000, U.S. patent application Ser. No. 09/960,902 entitled "Method And Apparatus For Structuring, Maintaining, And Using Families Of Data" filed Sep. 20, 2001, U.S. patent application Ser. No. 10/022,056 entitled "Method And Apparatus For Transforming Data" filed Dec. 12, 2001, U.S. patent application Ser. No. 09/960,541 entitled "Method And Apparatus For Dynamically Formatting And Displaying Tabular Data In Real Time" filed Sep. 20, 2001, U.S. patent application Ser. No. 10/172,572 entitled "Method And Apparatus For Generating And Utilizing Qualifiers And Qualified Taxonomy Tables" filed Jun. 13, 2002, U.S. patent application Ser. No. 10/990,293, entitled "Accelerated System And Methods For Synchronizing, Managing, And Publishing Business Information" filed Nov. 15, 2004, U.S. patent application Ser. No. 10/990,292 entitled "System And Method For Dynamically Constructing Synchronized Business Information User Interfaces" filed Nov. 15, 2004, U.S. patent application Ser. No. 10/990,294 entitled "System And Method For Dynamically Modifying Synchronized Business Information Server Interfaces" filed Nov. 15, 2004, are all hereby incorporated herein by reference.

While the invention herein disclosed has been described by means of specific embodiments and applications thereof, numerous modifications and variations could be made thereto by those skilled in the art without departing from the scope of the invention set forth in the claims.

What is claimed is:

1. A method of generating documents for a plurality of audiences in multiple languages utilizing a computer system and data repository comprising:

creating a data repository on a computer system, said data repository comprising a data attribute table and a meta-data table;

accepting data on said computer system for an existing audience associated with an existing audience identifier, said existing audience comprising a group of document consumers associated with a language, country, region, regulation, and culture;

accepting a subset of data on said computer system for an additional audience with respect to said existing audience into said data attribute table, wherein said additional audience is associated with an additional audience identifier, said additional audience and said existing audience share at least one shared data value, and said subset of data is unique to said additional audience with respect to said existing audience;

storing said subset of data in said data repository in association with said additional audience identifier, wherein said at least one shared data value exists in said data repository in association with said existing audience identifier;

modifying an audience order table to reflect a relationship between said existing audience identifier and said additional audience identifier, wherein said audience order table specifies a hierarchical relationship and a preferred traversal path between said existing audience and said additional audience;

storing meta-data on said computer system about internal organization of documents for a plurality of audiences into said meta-data table;

selecting an audience identifier; and generating at least one document on said computer system for at least one audience from said data repository, said generating step comprising: compiling document data from said data repository associated with said at least one audience using said audience hierarchy and said meta-data table compiled using said audience identifier and said audience order table.

2. The method of claim 1 wherein said generating step further comprises:

using said selected audience identifier to obtain an audience order data from said audience order table;

using said audience order data to traverse said audience hierarchy to identify document data for use in generating said documents for said plurality of audiences; and using said audience order data to traverse said meta-data table to identify document meta-data for use in generating at least one field name for said documents for said plurality of audiences.

3. The method of claim 1 wherein said generated documents for said plurality of audiences are versions of an electronic document.

4. The method of claim 3 wherein said electronic document is a web page.

5. The method of claim 1 wherein said generated documents for said plurality of audiences are versions of a paper document.

6. The method of claim 5 wherein said paper document is a print catalog.

7. The method of claim 1 wherein said storing multi-language document data step further comprises importing said multi-language document data and associating said imported data with an audience.

8. The method of claim 1 wherein said meta-data further comprises a name for a grouping of said multi-language document data.

9. The method of claim 8 wherein said name is a table name.

10. The method of claim 8 wherein said name is a field name.

11. The method of claim 1 further comprising:

displaying a plurality of multi-language document data selected for generating said documents for said plurality of audiences in different colors, said different colors indicative of an inheritance layer for each of said plurality of multi-language document data in said audience hierarchy.

* * * * *